United States Patent
Shinoda

(10) Patent No.: US 6,486,989 B2
(45) Date of Patent: *Nov. 26, 2002

(54) OPTICAL COMMUNICATIONS TERMINAL STATION, OPTICAL SIGNAL TRANSMISSION METHOD, AND OPTICAL SIGNAL INCREASING METHOD IN WAVELENGTH MULTIPLEXING SYSTEM

(75) Inventor: Naohiro Shinoda, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,779

(22) Filed: Apr. 30, 1998

(65) Prior Publication Data

US 2002/0067524 A1 Jun. 6, 2002

(30) Foreign Application Priority Data

Jan. 14, 1998 (JP) ............................................. 10-005297

(51) Int. Cl.⁷ ............................................... H04J 14/02
(52) U.S. Cl. ......................... 359/134; 359/161; 359/133
(58) Field of Search ................................ 359/124, 133, 359/181, 177, 134, 337, 161

(56) References Cited

U.S. PATENT DOCUMENTS

| | | | | | |
|---|---|---|---|---|---|
| 5,243,610 A | * | 9/1993 | Murata | ......................... | 372/21 |
| 5,596,667 A | * | 1/1997 | Watanabe | ..................... | 385/122 |
| 5,680,247 A | * | 10/1997 | Okuno | ........................ | 359/341 |
| 5,710,649 A | * | 1/1998 | Mollenauer | .................. | 359/123 |
| 5,777,770 A | * | 7/1998 | Naito | .......................... | 359/179 |
| 5,798,853 A | * | 8/1998 | Watanabe | ..................... | 359/160 |
| 6,020,990 A | * | 2/2000 | Brock | ......................... | 359/300 |
| 6,023,366 A | | 2/2000 | Kinoshita | .................... | 319/341 |

FOREIGN PATENT DOCUMENTS

| | | |
|---|---|---|
| JP | 8-288930 | 11/1996 |
| JP | 9-247098 A | 9/1997 |
| JP | 9-321701 | 12/1997 |
| WO | WO/94/09403 | 4/1994 |

OTHER PUBLICATIONS

Govind Agrawal, "Nonlinear Fiber Optics"; Quantum Electronics —Principles and Applications; pp. 289–311.

* cited by examiner

Primary Examiner—Kinfe-Michael Negash
(74) Attorney, Agent, or Firm—Staas & Halsey LLP

(57) ABSTRACT

An OPC generates a pump light having the wavelength $\lambda s$ with a power larger than a threshold for generating a nonlinear effect in an optical fiber for a main signal having the wavelengths $\lambda 1$ through $\lambda 4$ transmitted from an OS, and wavelength-multiplexes the generated light with the main signal. When the pump light induces a nonlinear effect, a signal light having the wavelengths $\lambda 1'$ through $\lambda 4'$ is generated symmetrically to a main signal having the wavelength $\lambda 1$ through $\lambda 4$ about the pump light on a wavelength axis. Thus, in a wavelength multiplexing system designed based on an eight-wave transmission, a signal light can function as a compensation light even when only four waves are used at the initialization of the system, thereby compensating for the characteristics of the system operations. Furthermore, the system is effective in cost because it simply requires an OPC for generating a pump light regardless of the number of compensation lights to be generated.

9 Claims, 16 Drawing Sheets

OPTICAL COMMUNICATIONS TERMINAL STATION, OPTICAL SIGNAL TRANSMISSION METHOD, AND OPTICAL SIGNAL INCREASING METHOD IN WAVELENGTH MULTIPLEXING SYSTEM

BACKGROUND OF THE INVENTION

1. Field of the Invention

The present invention relates to an optical communications system based on a WDM (wavelength division multiplexing) technology.

2. Description of the Related Art

The transmission capacity of an optical fiber system has been increased by raising the bit rate of an optical signal from a transmission unit. Recently, there is a tendency to transmit a large volume of information using a plurality of wavelengths through the WDM technology. Therefore, it is necessary to design an upgradable communications system based on the increase in number of wavelengths to be multiplexed according to a request to increase the transmission capacity for the future.

In designing an optical wavelength multiplexing system with the upgrade taken into account, the maximum number of multiplexed wavelengths is computed. With a thus designed system, the output level of an optical signal for the entire fiber becomes high to obtain a larger interval between repeaters and a higher margin of the S/N ratio. Furthermore, with such a system having a high output level, it is necessary to set the entire output of the optical signal to an output value estimated when the system is designed to keep constant operation characteristics of the system even before the upgrade and even with a small number of multiplexed wavelengths. For example, if the system is designed to transmit eight wavelengths and it actually transmits four wavelengths before the upgrade, then it is necessary to set the entire output of the optical signals to be transmitted as the output for eight wavelengths even if four wavelengths are currently transmitted. Therefore, when four wavelengths are transmitted, the output per wave should be set larger. However, it is also necessary to reduce the output of an optical signal per wave to prevent a nonlinear effect. As a result, in addition to a normal optical signal, a compensation light is transmitted to keep constant output and reduce the output per wave.

FIG. 1 shows the undersea optical cable communications system for multiplexing the wavelengths of four waves in consideration of the upgrade for eight waves for the future.

An undersea branching unit BU 73 between stations A and B can branch a specific wavelength ($\lambda 4$), and wavelength-multiplex the branched wavelength with a plurality of wavelengths to send the branched wavelength to a branch station C using a band-pass filter. With the configuration shown in FIG. 1, repeaters 70, 71, and 72 are respectively provided in a transmission line provided between the station A and the BU 73, a transmission line provided between the BU 73 and the station B, and a transmission line provided between the BU 73 and the station C. In FIG. 1, each of the repeaters 70, 71, and 72 is provided as a single unit in each transmission line. Actually, a plurality of repeaters can be provided in each transmission line.

With the configuration shown in FIG. 1, the entire output of an optical signal can be constant and the optical output per wave can be reduced by adding a 4-wave compensation light (indicated by dotted lines) to the 4-wave optical signal (having the wavelengths $\lambda 1$ through $\lambda 4$). Each of an optical signal and a compensation light requires one OS (optical sender) per wave. In the system designed for an 8-wave transmission line, four OSs are required for compensation lights in addition to OSs for 4-wave optical signals containing information.

The system shown in FIG. 1 is designed to branch 2-wavelength optical signals and transmit them to the station C. Before the grade-up of the system, only an optical signal having the wavelength $\lambda 4$ is transmitted to the station C as a signal containing information. However, since the system is designed to transmit 2-wavelength optical signals to the station C in the system design, the output of an optical signal in the transmission line between the BU 73 and the station C cannot be set to the value defined when the system is designed if only optical signals having the wavelength $\lambda 4$ are transmitted. Therefore, one of the compensation lights transmitted from the station A is designed to be branched by the BU 73 and transmitted to the station C. As a result, the entire output level of the optical signal transmitted between the BU 73 and the station C can be set to the value defined when the system is designed, thereby securing stable system operations and reliability.

When an optical signal from the station C is wavelength-multiplexed by the BU 73 with an optical signal directly received from the station A, the system performance is deteriorated if there is a difference in power level between the signals. Consequently, it is necessary to keep an equal power level between the optical signals from the station A and the optical signals from the station C. A method of keeping an equal power level can be a method using a dummy light as disclosed by Tokuganhei 8-282822, Tokuganhei 9-208899, etc. This method is based on the phenomenon that the power level of an optical signal to be transmitted can be changed depending on the power level of a dummy light when the optical signal to be transmitted and a power-level-variable dummy light are transmitted after being multiplexed in wavelength, and then pass through the repeater 72. Thus, the power level of the optical signal from the station C can match the power level of the optical signal from the station A by adjusting the power level of the dummy light. Accordingly, as shown in FIG. 1, a main signal having the wavelength $\lambda 4$, its compensation light, and a dummy light for adjusting the power level are transmitted from the station C. The dummy light is removed by the BU 73.

As described above, if a wavelength multiplexing system is designed with the number of multiplexed wavelengths set larger for an upgraded system in the future than the value defined when the system is initiated, then it is necessary, when the system is activated, to transmit a compensation light in addition to an optical signal containing information so that the entire output of the optical signals transmitted through the optical transmission line such as an optical fiber, etc. can be kept constant. Consequently, an optical transmission terminal station requires the OSs for the corresponding number of compensation lights in addition to the OSs of optical signals having a plurality of wavelengths. As a result, the system is not desirable in cost.

SUMMARY OF THE INVENTION

The present invention aims at providing a characteristic compensation device for an optical wavelength multiplexing system for generating compensation lights without using OSs for the corresponding number of a plurality of compensation lights.

In the wavelength multiplexing optical transmission communications system, the optical communications terminal station according to the present invention includes: an optical signal generation unit for generating a main signal containing information; a light generation unit for generating a light having a power large enough to generate a nonlinear effect of an optical transmission line; and a wavelength multiplexing unit for multiplexing the wavelengths of the main signal and the light generated by the light generation unit.

The optical communications terminal station according to another aspect of the present invention includes in the wavelength multiplexing optical transmission communications system: a broad-band light source for generating a light having a broad band wavelength; and a filter for filtering a light having a predetermined wavelength. With this configuration, the terminal station wavelength-multiplexes the light, which is output from the broad-band light source and passes through the filter, with the light generated by the optical signal generation unit for generating a main signal containing information.

The method of transmitting an optical signal according to the present invention is a method of transmitting an optical signal in the wavelength multiplexing optical transmission communications system including the steps of: (a) generating a main signal light containing information; (b) generating a light having a power large enough to generate a nonlinear effect of an optical transmission line; (c) generating a light by the effect of four wave mixing from the light obtained in steps (a) and (b); (d) transmitting the lights obtained in steps (a), (b), and (c) through the optical transmission line.

The method of transmitting an optical signal according to another aspect of the present invention is a method of transmitting an optical signal in a wavelength multiplexing optical transmission communications system and includes the steps of: (a) generating a light having a broad band of wavelength; (b) passing a light having a predetermined wavelength among the lights generated in step (a); (c) generating a main signal light containing information; and (d) transmitting the lights obtained in steps (b) and (c) through the optical transmission line.

According to the present invention, it is not necessary to provide optical transmitters for the corresponding number of compensation lights to be generated because generated are the compensation lights required when the system is operated with the number of multiplexed wavelengths smaller than the number of multiplexed wavelengths estimated when the system is designed. Compensation lights can be generated by the nonlinear effect induced in the optical transmission line by the light generated by the light generation unit, or can be generated by passing a light from a broad-band light source through a filter. Therefore, the number of optical transmitters can be decreased and the entire cost for the system can be reduced.

Furthermore, the light generated by the light generation unit can be used in broadcast, and can also be used as a level control light for a main signal. A light generated by the nonlinear effect induced by the light generated by the light generation unit is the same optical signal as the main signal. Therefore, it can be used as a spare signal for the main signal. When a compensation light is generated by passing a light from a broad-band light source through a filter, the compensation light does not contain any signal. Therefore, the generated compensation light can be modulated for broadcast. Otherwise, an optical signal, which is generated by the nonlinear effect induced by a light generated by the light generation unit and contains the same information as the main signal, can be used to detect an error in the main signal.

DESCRIPTION OF THE PREFERRED EMBODIMENTS

Figure 1:
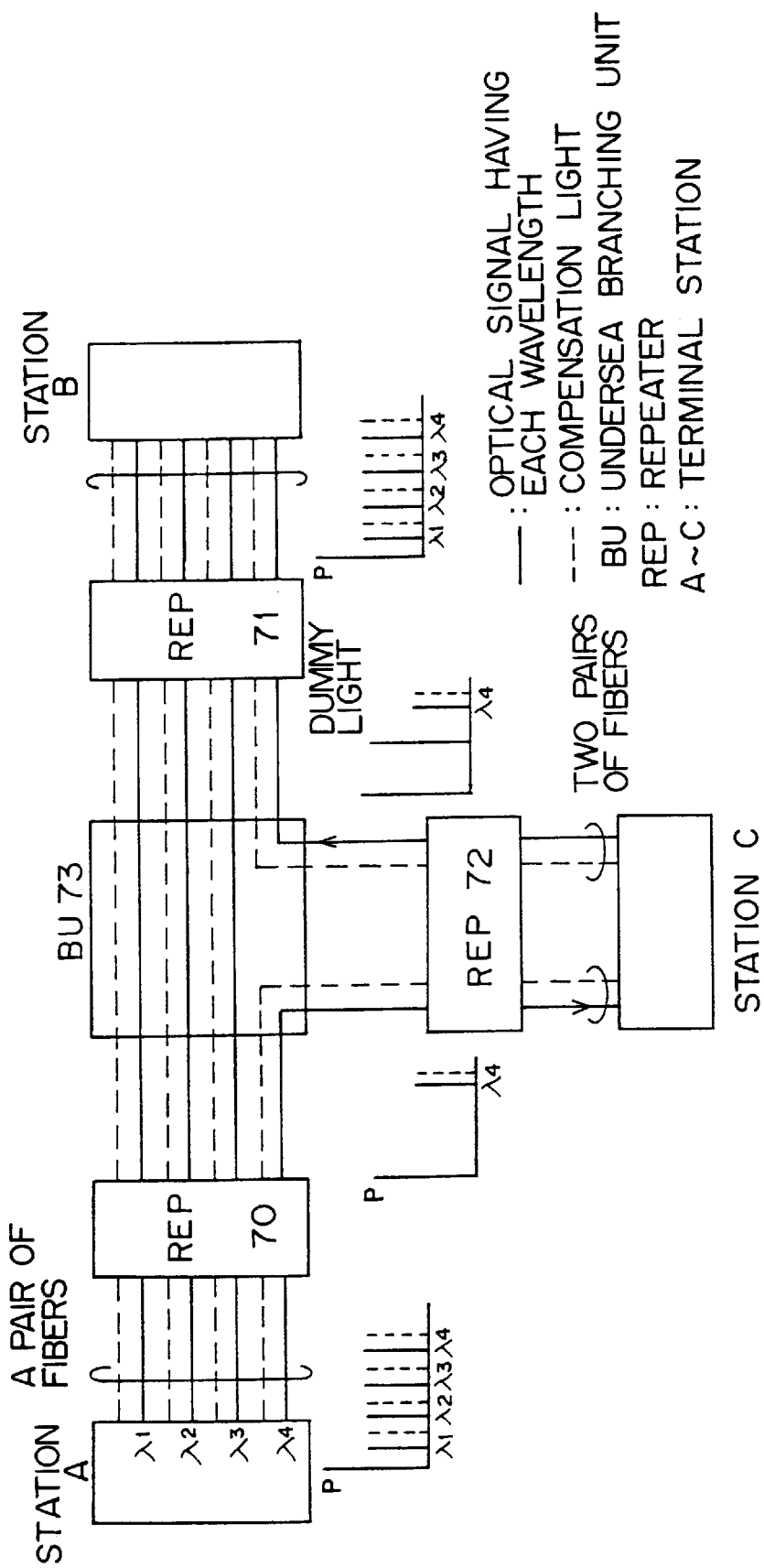
FIG. 1 shows the 4-wave wavelength-multiplexing undersea optical cable communications system with the upgrade for eight waves taken into account.
Figure 2:
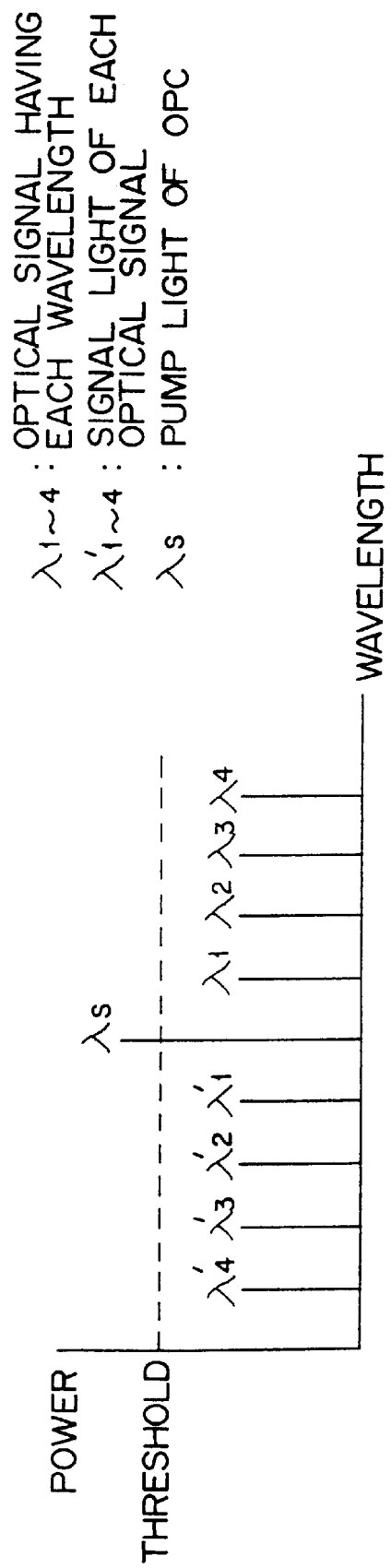
FIG. 2 shows the generation of a compensation light through an OPC and the configuration of the optical transmission terminal station according to an embodiment (No. 1)
Figure 3:
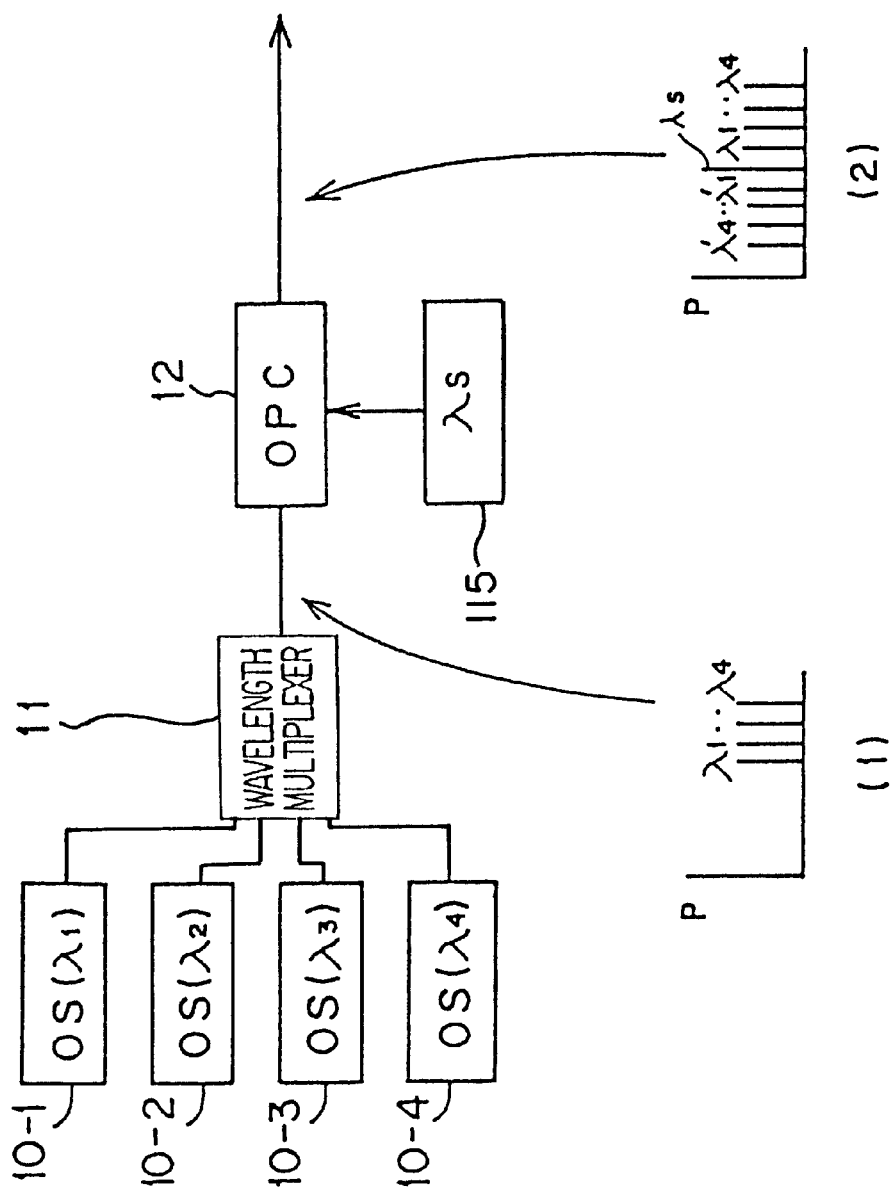
FIG. 3 shows the generation of a compensation light through an OPC and the configuration of the optical transmission terminal station according to an embodiment (No. 2)

FIGS. 2 and 3 show the generation of a compensation light through an OPC and the configuration of the optical transmission terminal station.

An OPC is short for an optical phase conjugator. Normally, an optical signal is transmitted with output equal to or smaller than a predetermined threshold for each wavelength in order to reduce the nonlinear effect of an optical fiber. However, if the optical output exceeds the threshold of the nonlinear effect by the 4-wave mixing of optical fibers, then optical signals different in wavelength propagating in optical fibers function as individual light sources under certain conditions and generate and propagate each other. Especially, it is assumed that optical signals having the wavelengths λ1 through λ4 propagate in optical fibers. If a light (having the wavelength λs, a pump light) which has a wavelength different from the above described wavelengths and has an output larger than the threshold for generating a 4-wave mixing is input, then four signal lights having the wavelengths λ1' through λ4' are generated along the wavelength axis symmetrically to the four optical signals having the wavelengths λ1 through λ4 about the pump light having the wavelength λs coupled to the four optical signals by the OPC as shown in FIG. 2. These are the optical signals generated by the optical fibers indicating through the non-linear effect the operations similar to those of an optical oscillator. These signal lights having the wavelengths λ1' through λ4' are copied from the optical signals having the wavelength 11 through 14 as having the same signal pattern but different wavelengths. The four generated signal lights are used as compensation lights.

Now, OPC refers to a combination of the coupler which couples the pump light with main optical signals, and a light source for the pump light.

The compensation lights having the wavelengths λ1' through λ4' can also be used as spare signals for the main signals having the wavelengths λ1 through λ4. Otherwise, they can be used in detecting an error in a main signal. When the degree of multiplexing the wavelengths of main signals is increased, either the transmission of a pump light is stopped or the power is reduced down to the level such that the nonlinear effect cannot be generated.

FIG. 3 shows an example of the configuration at the optical transmission terminal station.

As shown in FIG. 3, the optical transmission terminal station is provided with OSs 10-1 through 10-4 for transmitting an optical main signal (having the wavelengths λ1 through λ4 without limiting the number of multiplexed wavelengths to 4). The optical signal output from each of the OSs is multiplexed with each other by a wavelength multiplexer 11, and input to the OPC. The optical signal output from the wavelength multiplexer 11 is obtained by multiplexing four different wavelengths of optical signals as indicated by (1) shown in FIG. 3.

A control signal (light generation unit 115) for outputting an optical signal having the wavelength λs is input to an OPC 12 which receives an optical signal from the wavelength multiplexer 11. The wavelength of the light produced by the light generation unit 115 and oscillated by the OPC 12 is λs, and the output of the light is larger than the threshold for the nonliner effect of an optical fiber. When such a pump light is multiplexed to the optical signal indicated by (1) shown in FIG. 3, four signal lights (compensation lights) having the wavelengths λ1' through λ4' are generated symmetrically to the main optical signals having the wavelengths λ1 through λ4 as described above about the pump light having the wavelength λs. The optical signal output to the transmission line comprises a main signal having the wavelengths λ1 through λ4, signal lights having the wavelengths λ1' through λ4', and a pump light having the wavelength λs as indicated by (2) shown in FIG. 3.

With the optical transmission system originally designed for the 8-wave transmission, even when only four waves are transmitted during the operation of the system, the output of the entire optical signal can be the same as the output generated when eight waves are transmitted, by generating signal lights having the wavelengths λ1' through λ4'. Therefore, the operations of the system can be compensated for, and the reliable communications service can be provided from the beginning of the operations of the system. In this case, since a pump light is contained in the transmitted optical signal, it should be recognized that the pump light is transmitted when the system is designed.

Since the pump light having the wavelength λs is transmitted to the entire system, it can be used as a broadcast signal from a terminal station to a plurality of terminal stations by containing information in the pump light. Each of the terminal stations is designed such that a band-pass filter for extracting a pump light having the wavelength λs is provided to obtain information from the pump light as a broadcast signal received from a terminal station.

Figure 4:
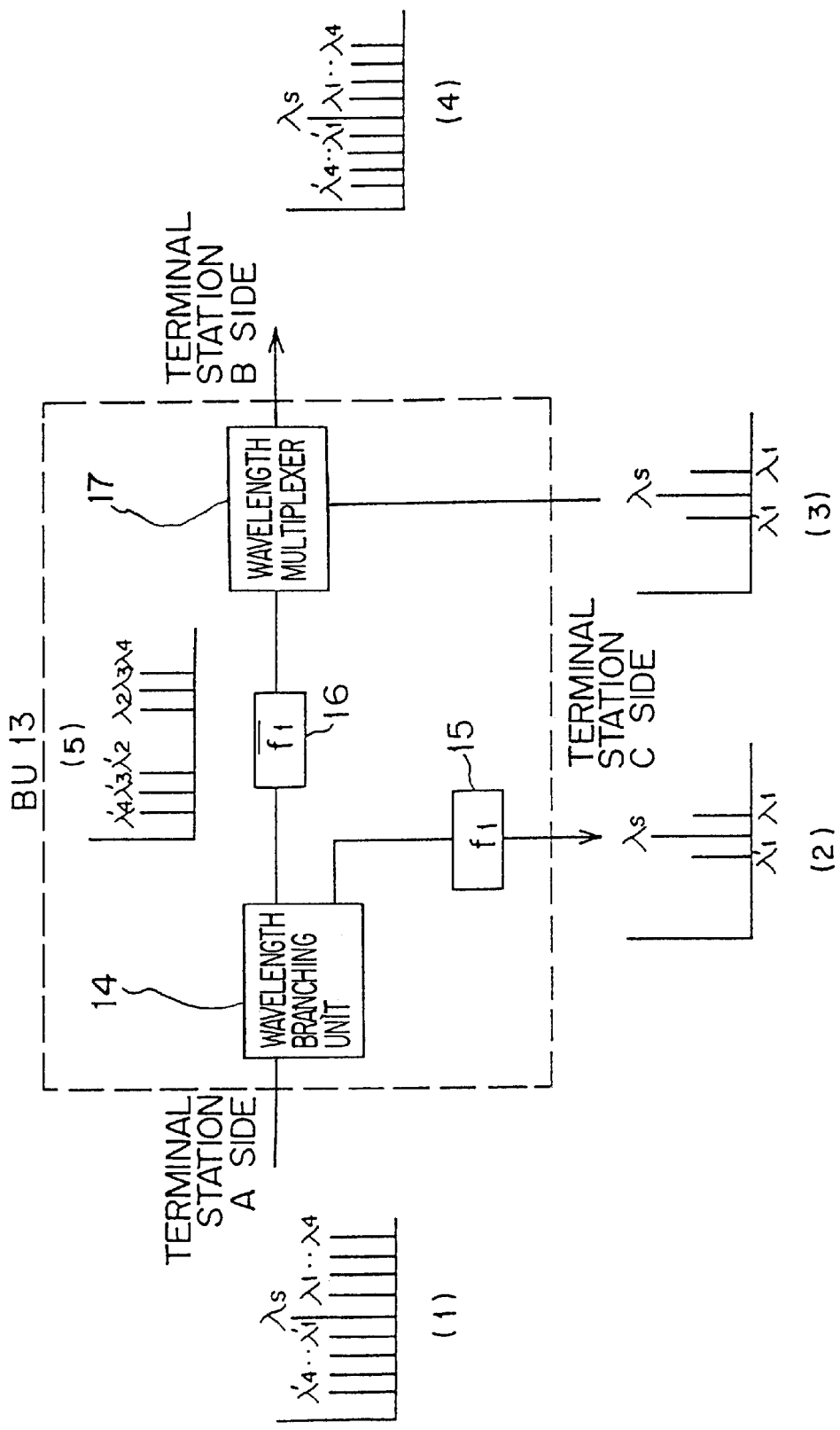
FIG. 4 shows an example of the configuration of the BU of the optical wavelength multiplexing system operated by the method shown in FIG. 2.

FIG. 4 shows an example of the configuration of the BU of the optical wavelength multiplexing system using the method shown in FIG. 2.

An optical signal input from the terminal station A is obtained by multiplexing the main signals having the wavelengths λ1 through λ4, the pump light having the wavelength λs, and the signal lights having the wavelengths λ1' through λ4' as indicated by (1) shown in FIG. 4. When an optical signal from the terminal station A is received by a demultiplexing unit 14 of a BU 13, the optical signal is branched and transmitted to band-pass filters 15 and 16. The bandpass filter 15 extracts only the main signal having the wavelength λ1, the signal light having the wavelength λ1', and the pump light having the wavelength λs. The band-pass filter 16 interrupts the main signal having the wavelength λ1, the signal light having the wavelength λ1', and the pump light having the wavelength λs, and passes the other optical signals.

Thus, the optical signal as indicated by (2) shown in FIG. 4 is branched, extracted, and transmitted to the terminal station C. The terminal station C transmits an optical signal obtained by multiplexing optical signals having the same wavelength as the optical signal branched and extracted by the BU 13 as indicated by (3) shown in FIG. 4. That is, the terminal station C transmits an optical signal containing the main signal having the wavelength λ1, the pump light having the wavelength λs, and the signal light having the wavelength λ1'. The optical signal transmitted from the terminal station C is input to a wavelength multiplexer 17, multiplexed with the optical signal transmitted from the wavelength branching unit 14 through the band-pass filter 16 as indicated by (5) shown in FIG. 4, and transmitted to the terminal station B. Since the optical signal transmitted to the terminal station B is obtained by coupling the optical signals indicated by (2) and (5) shown in FIG. 4, it has the same wavelength structure as the optical signal indicated by (1) shown in FIG. 4 and transmitted from the terminal station A. The information transmitted with the wavelength λ1 is different between the information from the terminal station A and the information from the terminal station C.

Since the BU 13 transmits the pump light having the wavelength λs from the terminal station A to the terminal station C, and then to the terminal station B, the pump light having the wavelength λs can be used as a broadcast signal.

As described above, a dummy light not shown in FIG. 4 can be transmitted from the terminal station C to the BU 13. However, according to the present embodiment, the function of the dummy light is performed by the pump light having the wavelength $\lambda$s. With the configuration according to the present embodiment, the power level of the pump light is designed to be adjustable so that the power level can be set higher when the power level of the optical signal from the terminal station C is high, and the power level can be set lower when the power level of the optical signal from the terminal station C is low. Thus, the power levels of the main signal having the wavelength $\lambda 1$ and the signal light having the wavelength $\lambda 1'$ transmitted from the terminal station C can be made to respectively match the power levels of the main signal having the wavelengths $\lambda 2$ through $\lambda 4$ and the signal light having the wavelengths $\lambda 2'$ through $\lambda 4'$ transmitted from the terminal station A, thereby maintaining a good state of the transmission characteristics of the entire system.

Figure 5:
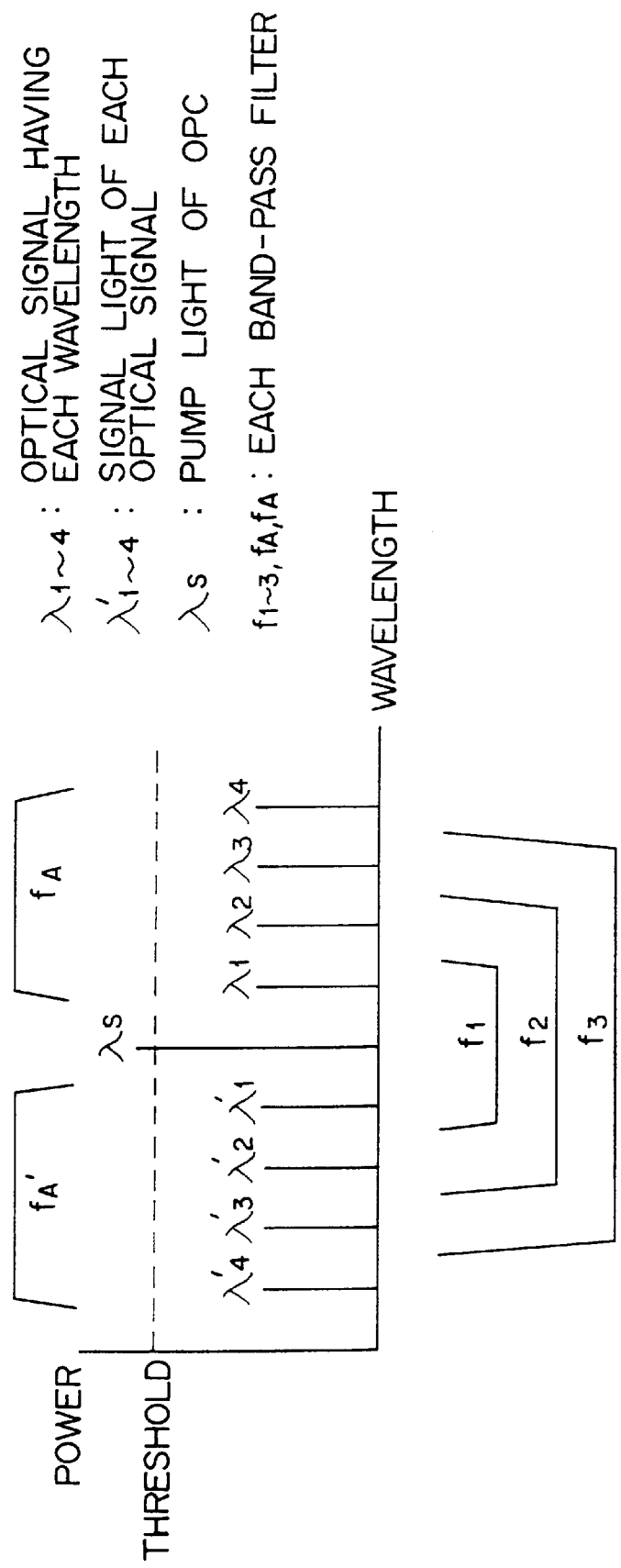
FIG. 5 shows the configuration (No. 1) used when another embodiment of the present invention is applied to the Add/Drop system.
Figure 6:
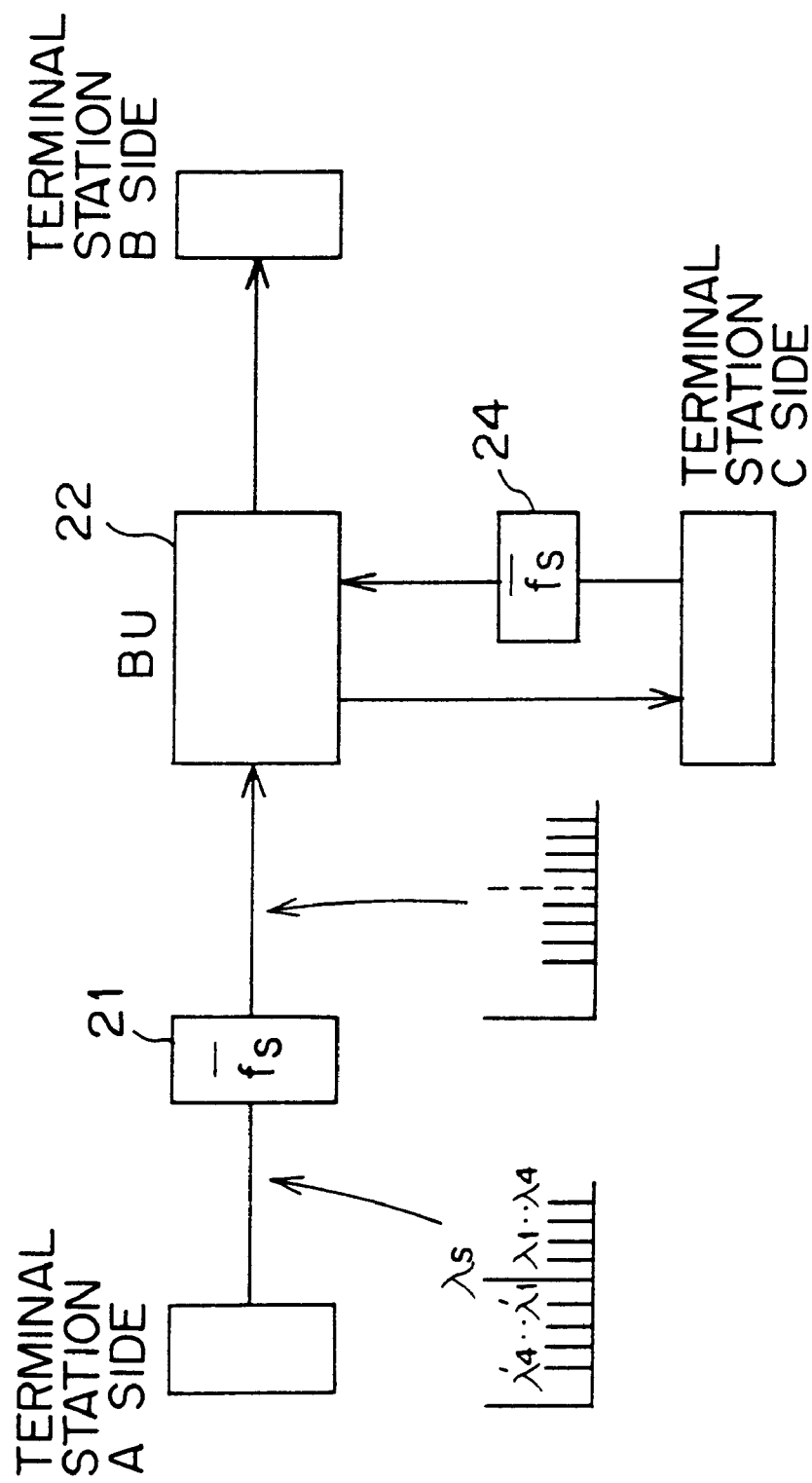
FIG. 6 shows the configuration (No. 2) used when another embodiment of the present invention is applied to the Add/Drop system.

FIGS. 5 and 6 show the configuration when another embodiment of the present invention is applied to the Add/Drop system.

FIG. 5 shows an example of the types of filters used when a wavelength is selected by the BU. The Add/Drop of the wavelength in the BU is executed by branching or multiplexing specific wavelengths (channels) using combinations of the band-pass filters of the f1 through f3, fA, and fA'. Now, the bandpass filter fA extracts only main signals with wavelengths $\lambda 1$–$\lambda 4$. The band-pass filter fB extracts only signal lights with wavelengths $\lambda' 1$–$\lambda' 4$. The band-pass filter fi passes the lights with wavelengths $\lambda 1$, $\lambda' 1$ and $\lambda$s. The band-pass filter f2 passes the lights with wavelengths $\lambda 1$–$\lambda 2$, $\lambda' 1$–$\lambda' 2$, and $\lambda$s. Lastly, the band-pass filter f3 passes the lights with wavelengths $\lambda 1$–$\lambda 3$, $\lambda' 1$–$\lambda' 3$, and $\lambda$s. For example, when the main signal having the wavelength $\lambda 1$ and the corresponding signal light having the wavelength $\lambda 1'$ are branched, the band-pass filter f1 is used. When the main signal having the wavelength $\lambda 1$ is extracted from the separated lights, the band-pass filter fA is used. Thus, only the main signal having the wavelength $\lambda 1$ can be branched by combining the bandpass filters f1 and fA. Similarly, the band-pass filter f2 is used when the lights having the wavelengths $\lambda 1$ and $\lambda 2$ and their signal lights are extracted. The band-pass filter f3 is used when the lights having the wavelengths $\lambda 1$, $\lambda 2$, and $\lambda 3$, and their signal lights are extracted. The filter fA is continuously used when only the main signal is extracted from the lights extracted above. The filter fA' is continuously used when only the signal light is extracted from the lights extracted above.

FIG. 6 shows the general configuration of the Add/Drop system.

In FIG. 6, the terminal stations A, B, and C are connected through a BU 22. Filters are provided between the terminal station A and the BU 22, and between the BU 22 and the terminal station C to remove the pump light generated by the OPC. In FIG. 6, the symbol with a bar above the characters fs drawn in the boxes indicating band-pass filters 21 and 24 refers to a band-pass filter for removing only the light having the wavelength $\lambda$s. Symbols without a bar above the characters fs refer to band-pass filters for passing only the light having the wavelength $\lambda$s. Symbols with f1, f2, f3, fA, or fA refer to band-pass filters corresponding to the band shown in FIG. 5. Each of these characters with a bar above it refers to a filter for interrupting only a corresponding band.

The terminal station A is provided with an OS, for each of the wavelengths to be multiplexed, for generating each of the main signals, and is also provided with an OPC (not shown in FIG. 6) so that a pump light can be multiplexed with the wavelength-multiplexed optical signal from the OS. An optical signal output from the terminal station A is obtained by multiplexing a main signal, a pump light, and a signal light generated from the pump light as shown below the terminal station in FIG. 6. When the optical signal passes through the band-pass filter 21, only the pump light having the wavelength $\lambda$s is removed from the optical signal.

The BU 22 branches a main signal having a predetermined wavelength and its signal light, transmits them to the terminal station C, and transmits the other optical signals to the terminal station B. The terminal station C generates a main signal having the same wavelength as the main signal branched by the BU 22, adds a pump light at the OPC (not shown in FIG. 6), generates a corresponding signal light for transmission. A pump light is removed through the band-pass filter 24 from the optical signal thus transmitted from the terminal station C, and the optical signal is input to the BU 22. The BU 22 multiplexes the optical signal from the terminal station A with the optical signal from the terminal station C, and transmits the resultant signal to the terminal station B.

Although FIG. 6 shows the case where an optical signal is transmitted from the terminal station A to the terminal station B, the optical signal can also be transmitted from the terminal station B to the terminal station A because the optical transmission line is designed to have a pair of optical fibers, that is, an up fiber and a down fiber. In this case, a band-pass filter for removing a pump light is provided between the BU 22 and the terminal station B although it is not shown in FIG. 6.

Figure 7:
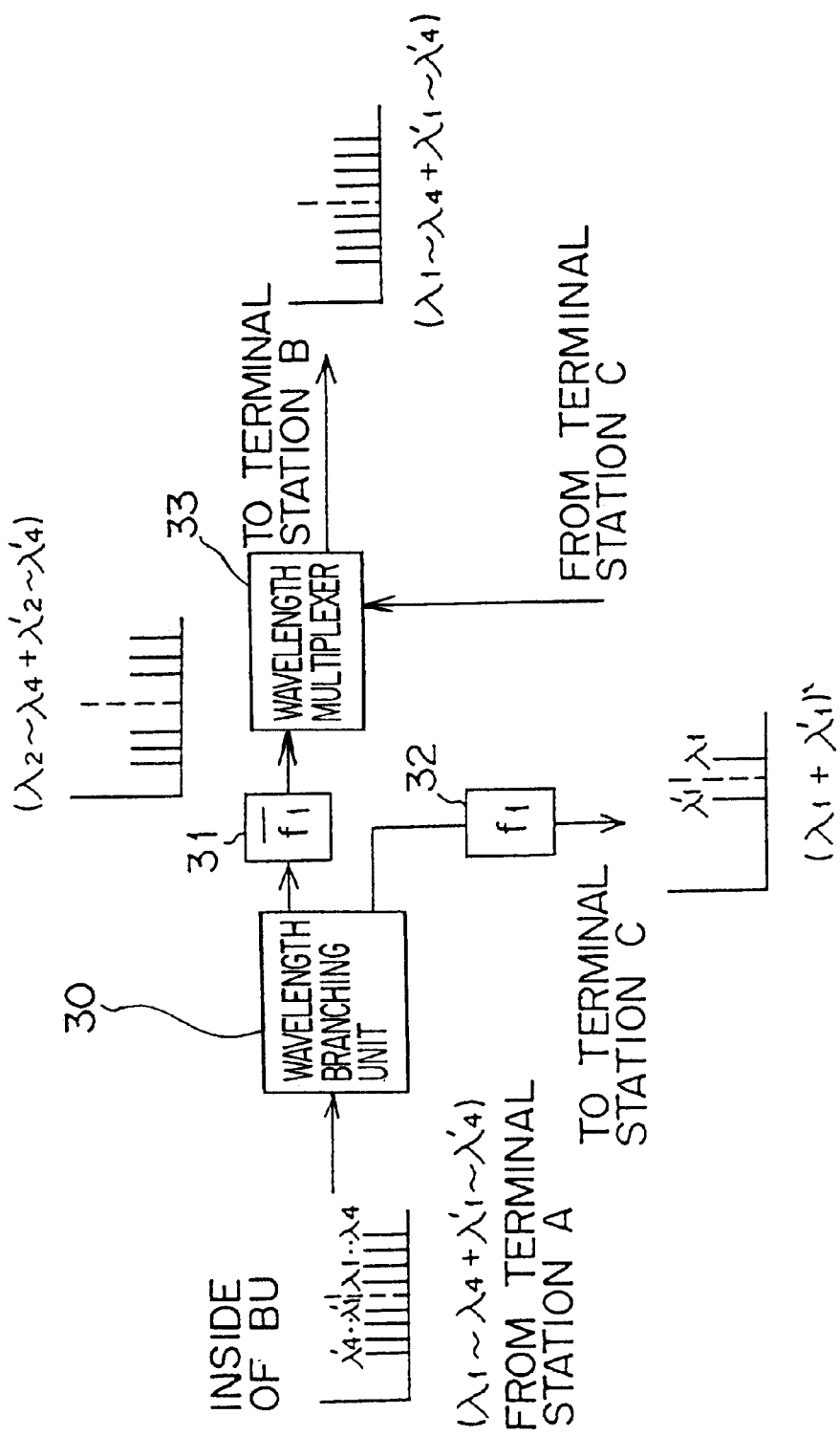
FIG. 7 shows an example (No. 1) of the configuration of each unit when only an optical signal having the wavelength $\lambda 1$ in the optical signals transmitted from the terminal station A is dropped into the station C.
Figure 8:
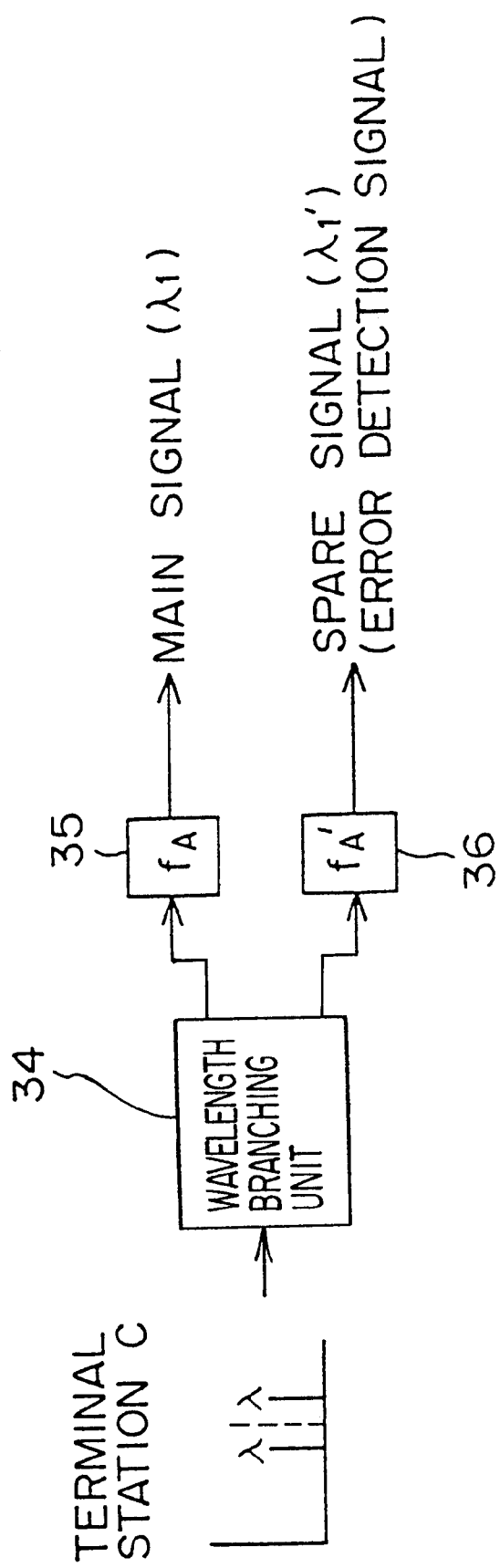
FIG. 8 shows an example (No. 2) of the configuration of each unit when only an optical signal having the wavelength $\lambda 1$ in the optical signals transmitted from the terminal station A is dropped into the station C.
Figure 9:
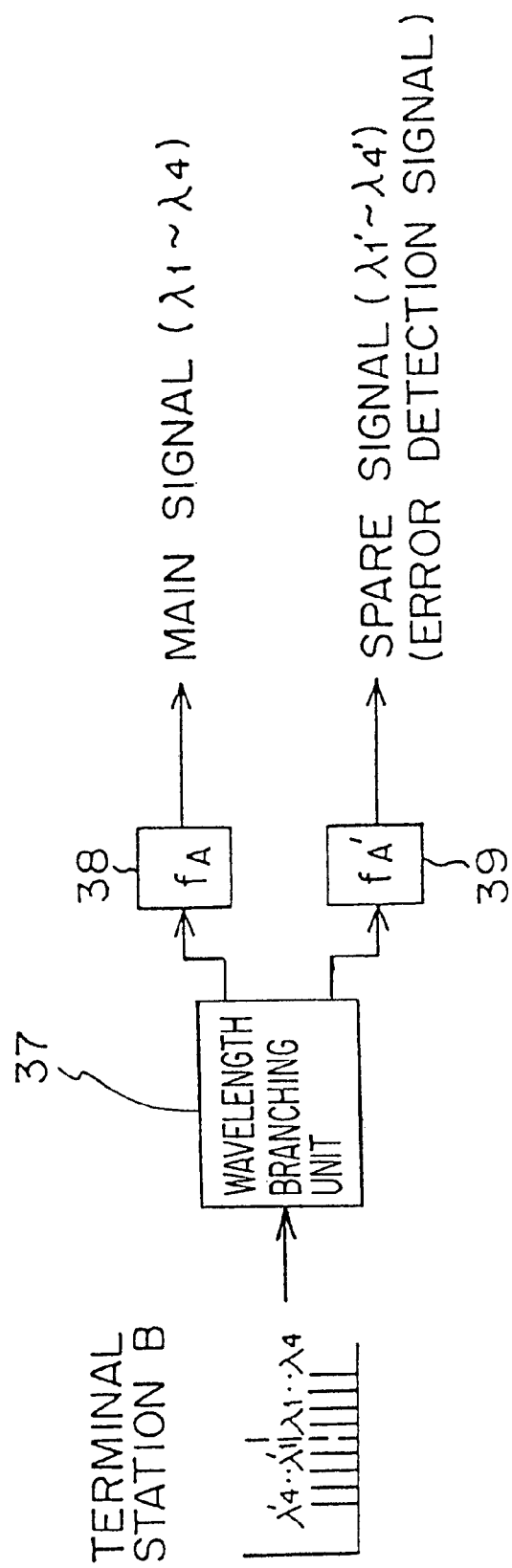
FIG. 9 shows an example (No. 3) of the configuration of each unit when only an optical signal having the wavelength $\lambda 1$ in the optical signals transmitted from the terminal station A is dropped into the station C.

FIGS. 7 through 9 show an example of the configuration of each unit when only the optical signal having the wavelength $\lambda 1$ of all optical signals transmitted from the terminal station A is dropped to the terminal station C.

FIG. 7 shows the configuration inside the BU in which only the wavelength $\lambda 1$ and its signal light are branched. An optical signal transmitted from the terminal station A is input to a wavelength branching unit 30, and branched into two optical signals. The two branched optical signals are identical to each other. The optical signal transmitted to the terminal station C is input to a band-pass filter 32 from which only the main signal having the wavelength $\lambda 1$ and its signal light are extracted and output. On the other hand, the optical signals transmitted to the terminal station B are input to a band-pass filter 31 which passes the optical signals other than the main signal having the wavelength $\lambda 1$ and its signal light, and the resultant signals are input to a wavelength multiplexer 33. The wavelength multiplexer 33 multiplexes the optical signal from the terminal station C with the optical signal from the band-pass filter 31, and transmits the resultant signal to the terminal station B. FIG. 7 shows the state of the optical signal at each unit. Thus, the main signal having the wavelengths $\lambda 1$ through $\lambda 4$ and its signal light are transmitted from the terminal station A, and only the main signal having the wavelength $\lambda 1$ and its signal light are transmitted to the terminal station C. The main signals having the wavelengths $\lambda 2$ through $\lambda 4$ and its signal light are transmitted to the wavelength multiplexer. From the terminal station C, the main signal having the wavelength $\lambda 1$ and its signal light are transmitted and input to the wavelength multiplexer. The main signal having the wavelength $\lambda 1$ through $\lambda 4$ and its signal light are transmitted to the terminal station B.

FIG. 8 shows the configuration of the receiving side of the terminal station C.

As described above, a signal light is almost the same as a corresponding main signal except in wavelength. Especially, they contain the same information. Therefore, when a signal light is independently used, it can be a spare signal for its main signal, or can be used in detecting an error in the main signal.

Therefore, the receiving unit in the terminal station can have, for example, the following configuration. That is, the optical signal transmitted from the BU is input to a wavelength branching unit 34 to branch into two identical optical signals. From one of the branched optical signals, only the main signal having the wavelength $\lambda 1$ is extracted by a band-pass filter 35. From the other branched optical signal, the optical signal having the wavelength $\lambda 1'$, that is, the signal light of the main signal, is extracted through a band-pass filter 36, and is used as a spare signal or an error detection signal for the main signal.

FIG. 9 shows the configuration of the receiving side of the terminal station B.

The configuration of the receiving unit in the terminal station B is almost the same as that in the terminal station C. That is, the optical signal, which has been transmitted from the BU and comprises the main signal having the wavelengths $\lambda 1$ through $\lambda 4$ and the signal light having the wavelengths $\lambda 1'$ through $\lambda 4'$, is input to a wavelength branching unit 37 to branch the optical signal into two identical optical signals. From one of the branched optical signals, only a main signal is extracted through a band-pass filter 38. From the other branched optical signal, only the signal light is extracted through a band-pass filter 39, and is received as a spare signal or an error detection signal.

When the signal light is used as a spare signal, the information obtained from the main signal is compared with the information obtained from a spare signal. If the information obtained from the main signal matches the information obtained from a spare signal, then it is determined that the signals have been correctly received.

Figure 10:
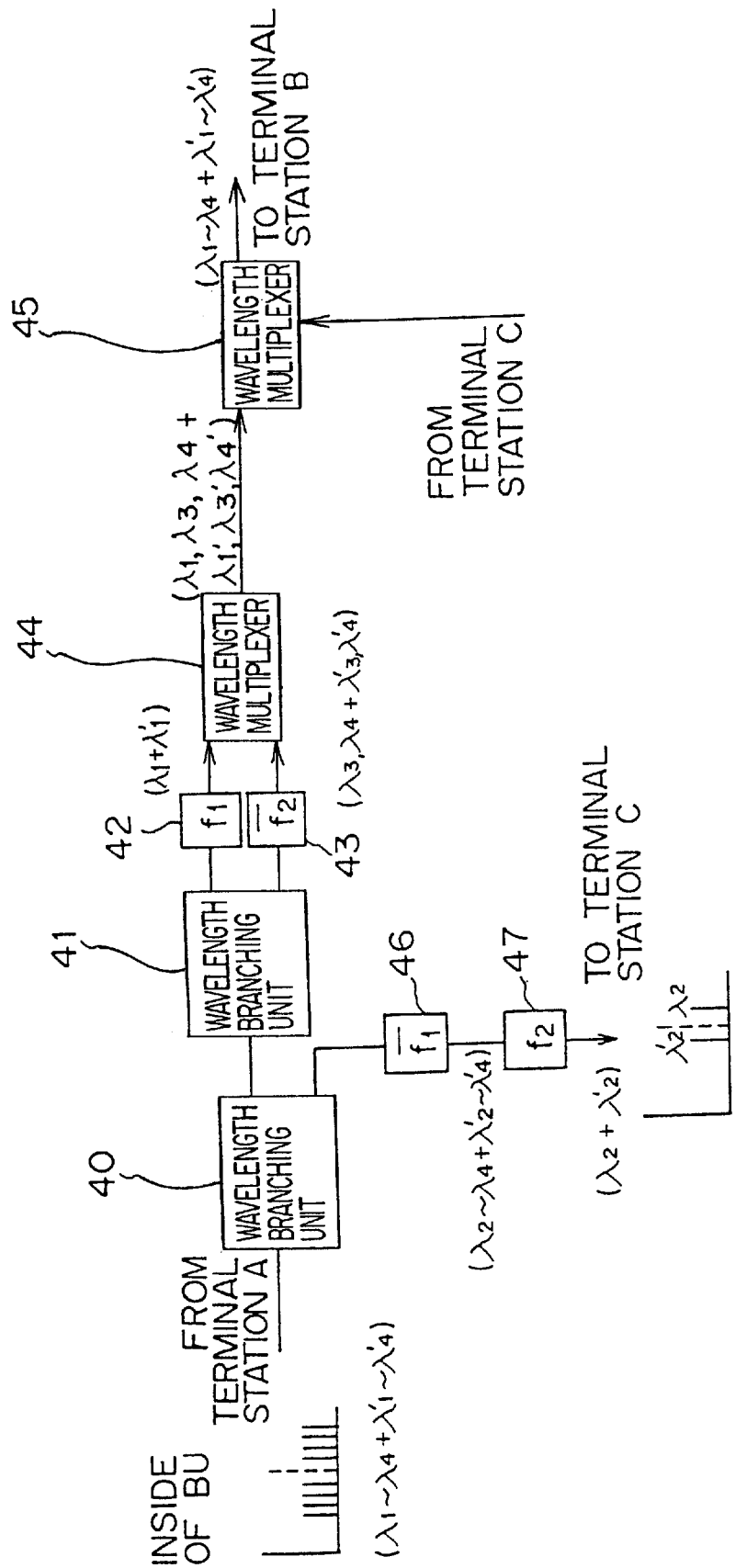
FIG. 10 shows the configuration (No. 1) of each unit when the wavelength $\lambda 2$ is added/dropped.
Figure 11:
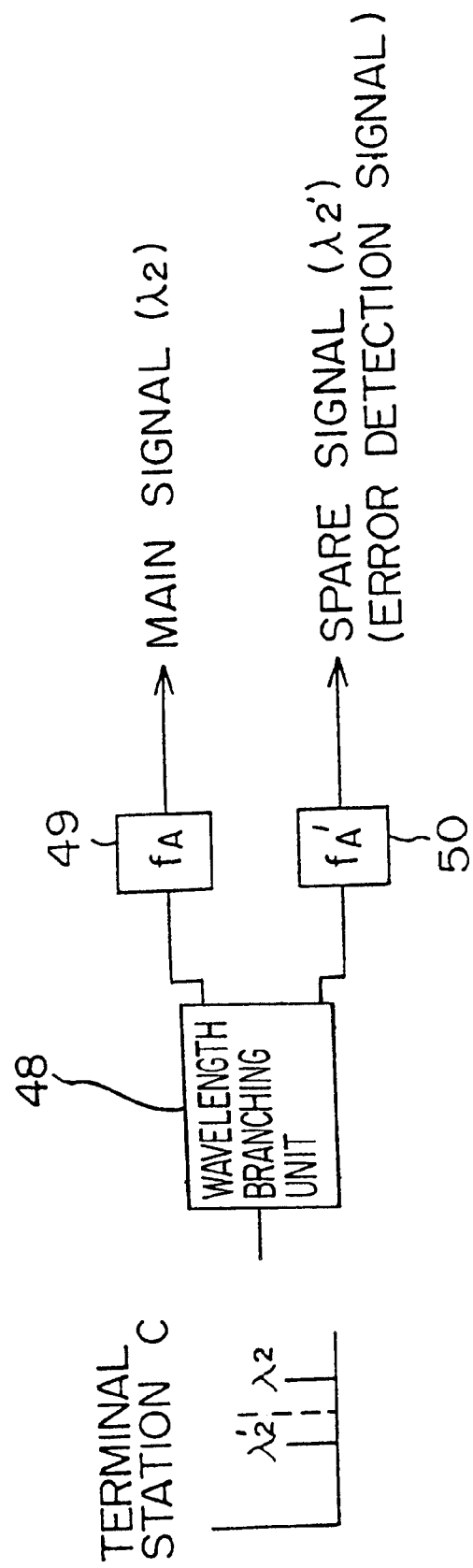
FIG. 11 shows the configuration (No. 2) of each unit when the wavelength $\lambda 2$ is added/dropped.
Figure 12:
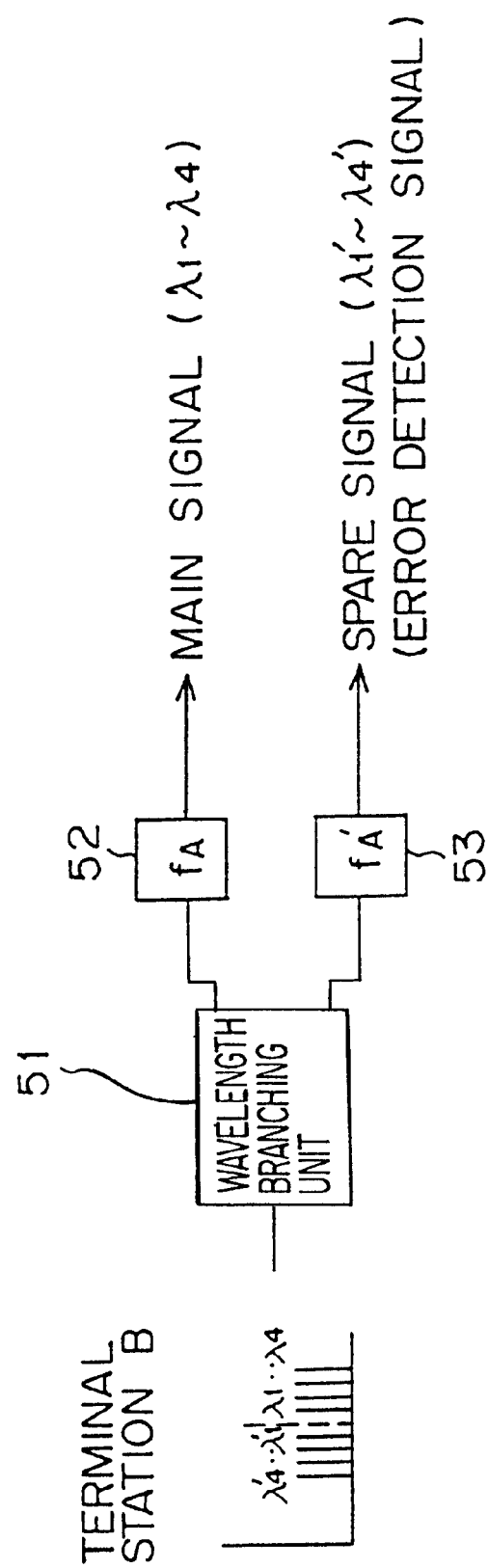
FIG. 12 shows the configuration (No. 3) of each unit when the wavelength $\lambda 2$ is added/dropped.

FIGS. 10 through 12 show the configuration of each unit when the wavelength $\lambda 2$ is added/dropped.

FIG. 10 shows an example of the configuration of the BU when the wavelength $\lambda 2$ and the signal light are branched. When the optical signal containing the main signal having the wavelengths $\lambda 1$ through $\lambda 4$ and the signal light having the wavelengths $\lambda 1'$ through $\lambda 4'$ is input from the terminal station A to a wavelength branching unit 40, the optical signal is branched into two identical optical signals. One signal is transmitted to a wavelength branching unit 41, and the other signal is transmitted to a band-pass filter 46.

The band-pass filter 46 cuts off the main signal having the wavelength $\lambda 1$ and the signal light having the wavelength $\lambda 1'$, and passes and transmits the other signals to a band-pass filter 47. The band-pass filter 47 passes the main signal having the wavelength $\lambda 2$ and the signal light having the wavelength $\lambda 2'$, and transmits them to the terminal station C. The bandpass-pass filter 46 is realized by inverting the functions of the band-pass filter f1 shown in FIG. 4. The band-pass filter 47 corresponds to the band-pass filter f2 shown in FIG. 4. Such band-pass filters can be realized using a fiber grating, etc. When a band is passed and another band is cut off by, for example, the band-pass filter 46, the output of a fiber grating can be appropriately changed.

The optical signal transmitted to the wavelength branching unit 41 is also branched into identical signals. One signal is input to a band-pass filter 42, and the other signal is input to a band-pass filter 43. The band-pass filter 42 passes the main signal having the wavelength $\lambda 1$ and the signal light having the wavelength $\lambda 1'$. The band-pass filter 43 cuts off the optical signal between the main signal having the wavelength $\lambda 2$ and the signal light having the wavelength $\lambda 2'$ as shown in FIG. 5. Therefore, the optical signals passing through the band-pass filter 43 are the main signals having the wavelengths $\lambda 3$ and $\lambda 4$, and signal lights having the wavelengths $\lambda 3'$ and $\lambda 4'$.

Then, the main signal having the wavelength $\lambda 1$ and its signal light passing through the band-pass filter 42, and the main signal having the wavelengths $\lambda 3$ and $\lambda 4$ and their signal lights passing through the band-pass filter 43 are multiplexed by a wavelength multiplexer 44. A wavelength multiplexer 45 receives from the terminal station A the optical signals from which the optical signal having the wavelength $\lambda 2$ and its signal light are removed. The main signal having the wavelength $\lambda 2$ and its signal light are transmitted from the terminal station C and input to the wavelength multiplexer 45. The input signals are multiplexed with the optical signals from the wavelength multiplexer 44 and transmitted to the terminal station B. The optical signal transmitted to the terminal station B contains a main signal having the wavelengths $\lambda 1$ through $\lambda 4$ and respective signal lights.

FIG. 11 shows an example of the configuration of the receiving unit in the terminal station C.

The optical signal transmitted from the BU to the terminal station C contains the main signal having the wavelength $\lambda 2$ and its signal light. A wavelength branching unit 48 branches the received optical signals, and transmits one to a band-pass filter 49 and the other to a band-pass filter 50. The band-pass filter 49 extracts only the main signal from the optical signals transmitted from the BU, and transmits the main signal having the wavelength $\lambda 2$ to a signal processing unit provided at a later stage not shown in FIG. 11. The band-pass filter 50 extracts only the signal light, and uses the signal light having the wavelength $\lambda 2'$ as a spare signal for the main signal. As described above, a spare signal can be used such that the main signal is compared with the spare signal to recognize lost information such as a missing bit, etc., and to receive a signal with higher precision (that is, the spare signal is used as an error detection signal).

FIG. 12 shows an example of the configuration of the receiving unit of the terminal station B.

The receiving unit in the terminal station B is the same in configuration as that in the terminal station C. First, an input optical signal is branched by a wavelength branching unit 51, and input to band-pass filters 52 and 53. The band-pass filter 52 extracts only the main signal from the optical signal received from the wavelength branching unit 51. Therefore, the optical signal output from the band-pass filter 52 contains the main signal having the wavelengths $\lambda 1$ through $\lambda 4$. On the other hand, the band-pass filter 53 extracts only the signal light from the optical signals transmitted from the wavelength branching unit 51. The optical signal output from the band-pass filter 53 contains the signal light having the wavelengths $\lambda 1'$ through $\lambda 4'$, and can be used as a spare signal for the main signal extracted by the band-pass filter 52 or an error detection signal.

FIGS. 1 through 12 show only the cases where signals having the wavelengths $\lambda 1$ and $\lambda 2$ are used for Add/Drop functions. Similarly, the optical signals having other wavelengths can be added/dropped with appropriate band-pass filters applied to branch a main signal having arbitrary optional wavelength and a corresponding signal light.

Figure 13:
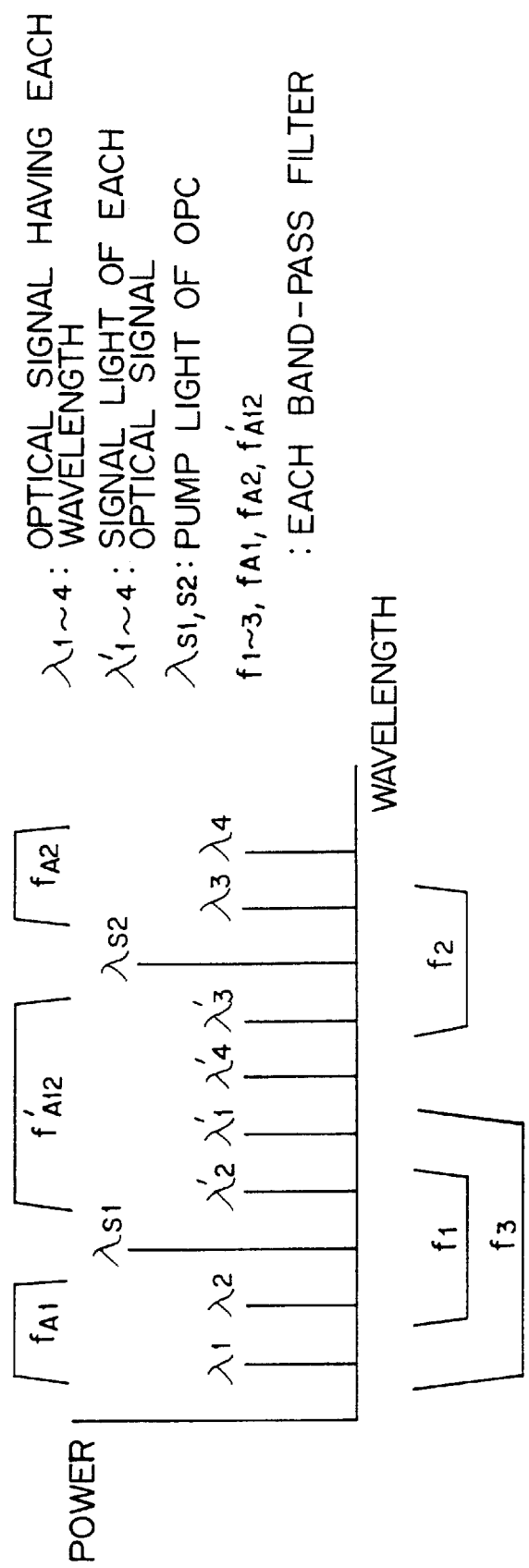
FIG. 13 shows an embodiment (No. 1) in which a plurality of pump lights are used.
Figure 14:
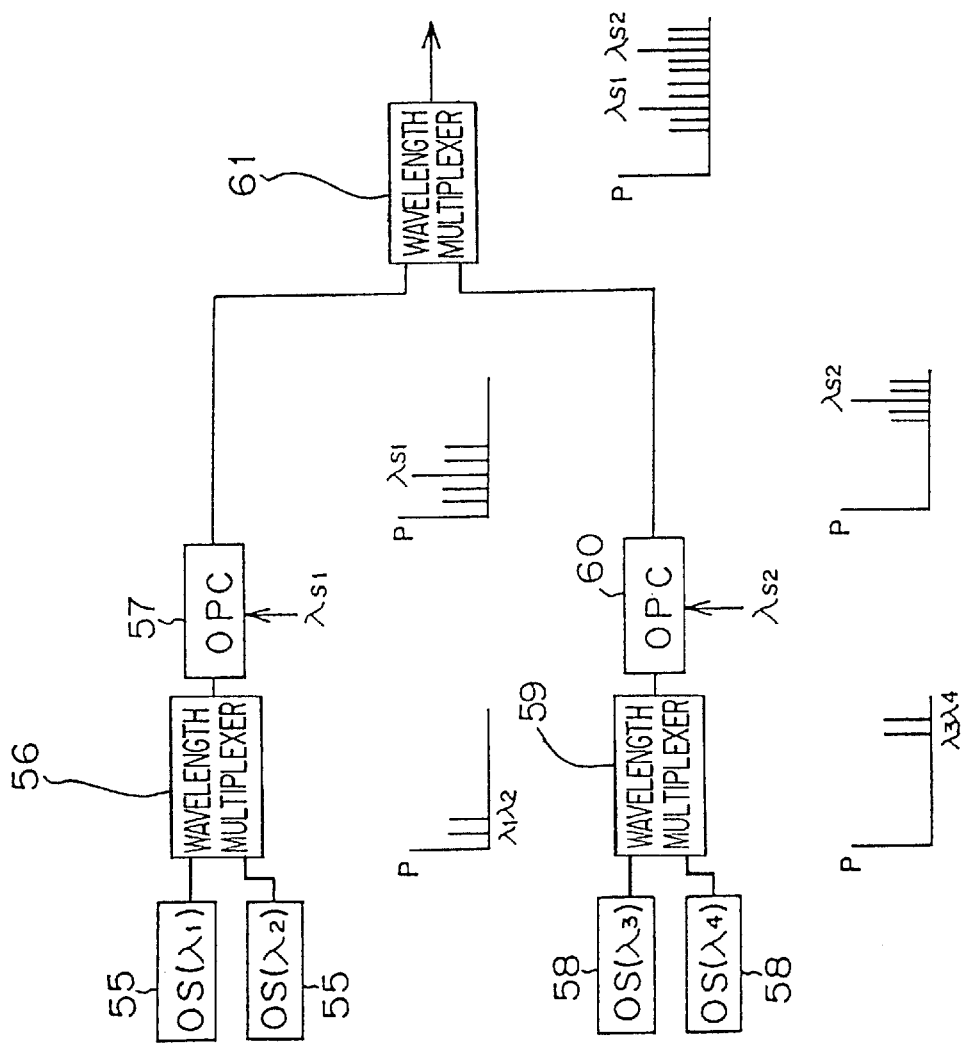
FIG. 14 shows an embodiment (No. 2) in which a plurality of pump lights are used.

FIGS. 13 and 14 show an embodiment in which a plurality of pump lights are used according to the present invention.

FIG. 13 shows the distribution of wavelengths when two pump lights are used. The pump light having the wavelength $\lambda s1$ is used to generate the signal lights having the wavelengths λ1' and λ2' respectively corresponding to the main signals having the wavelengths λ1 and λ2. The pump light having the wavelength λs2 generates the signal lights having the wavelengths λ3' and λ4' respectively corresponding to the main signals having the wavelengths λ3 and λ4. When a signal light is extracted as a spare signal for a specific main signal from the optical signals having the wavelength distribution as shown in FIG. 13, the band-pass filters f1, f2, f3, fA1, fA2, and fA12' shown in FIG. 13 are selectively used.

FIG. 14 shows an example of the configuration of the transmission station when the optical signal having the wavelength distribution shown in FIG. 13 is transmitted.

The transmission station is provided with OSs 55 and 58 for generating main signals having the wavelengths λ1 through λ2 respectively. The OS 55 generates the main signals having the wavelengths λ1 and λ2 which are multiplexed by a wavelength multiplexer 56. The multiplexed optical signal is input to an OPC 57. The OPC 57 generates a pump light (having the wavelength λs1) for generating a signal light of the main signal having the wavelengths λ1 and λ2, and generates a signal light to be added to the optical signal from the wavelength multiplexer 56. As described above, a pump light has a power stronger than that indicated by the threshold for generating a nonlinear effect of an optical fiber. According to the pump light, a signal light is generated corresponding to the main signal.

On the other hand, the OS 58 generates main signals having the wavelengths λ3 and λ4 which are multiplexed by a wavelength multiplexer 59. The pump light having the wavelength λs2 is assigned by an OPC 60 to the optical signal multiplexed by the wavelength multiplexer 59 to generate a signal light.

The optical signals from the OPCs 57 and 60 are multiplexed by a wavelength multiplexer 61, and transmitted through a transmission line. FIG. 13 shows the wavelength distribution of an optical signal output from the wavelength multiplexer 61. In FIG. 14, the distribution is shown below the wavelength multiplexer 61.

With the configurations shown in FIGS. 13 and 14, a signal light is generated between the pump lights having the wavelengths λs1 and λs2. Therefore, when signal lights for the main signals having the wavelengths λ1 through λ4 are generated by the pump lights having the wavelengths λs1 and λs2, the wavelengths should be set such that signal lights do not overlap each other. Unlike the cases shown in FIGS. 13 and 14, the wavelengths of the main signals can be set in the range of the wavelengths λs1 and λs2 of the pump lights so that the signal lights having the wavelengths λ1' through λ4' generated by the pump lights can be beyond the wavelengths λs1 and λs2 of the pump lights. In this case, it is necessary to set the main signals without overlap. It is also necessary to set the wavelengths of the main signals having the wavelengths λ1 through λ4, the pump lights having the wavelengths λs1 and λs2, and the signal lights having the wavelength λ1' through λ4' within the range of, for example, the amplified band of an optical amplifier provided, for example, in a transmission line.

Figure 15:
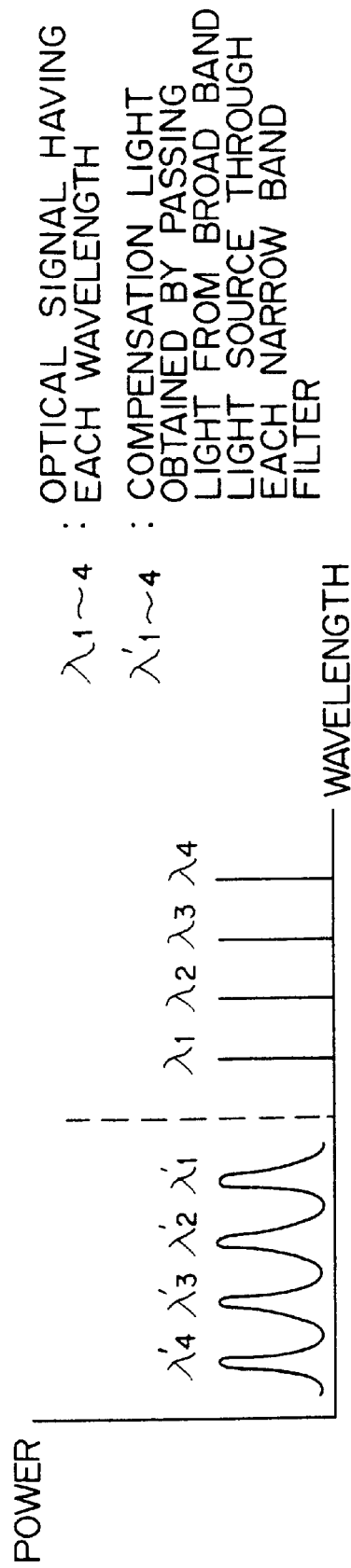
FIG. 15 shows an embodiment (No. 1) in which a compensation light is generated by passing a light from a broad-band light source through a narrow band filter.
Figure 16:
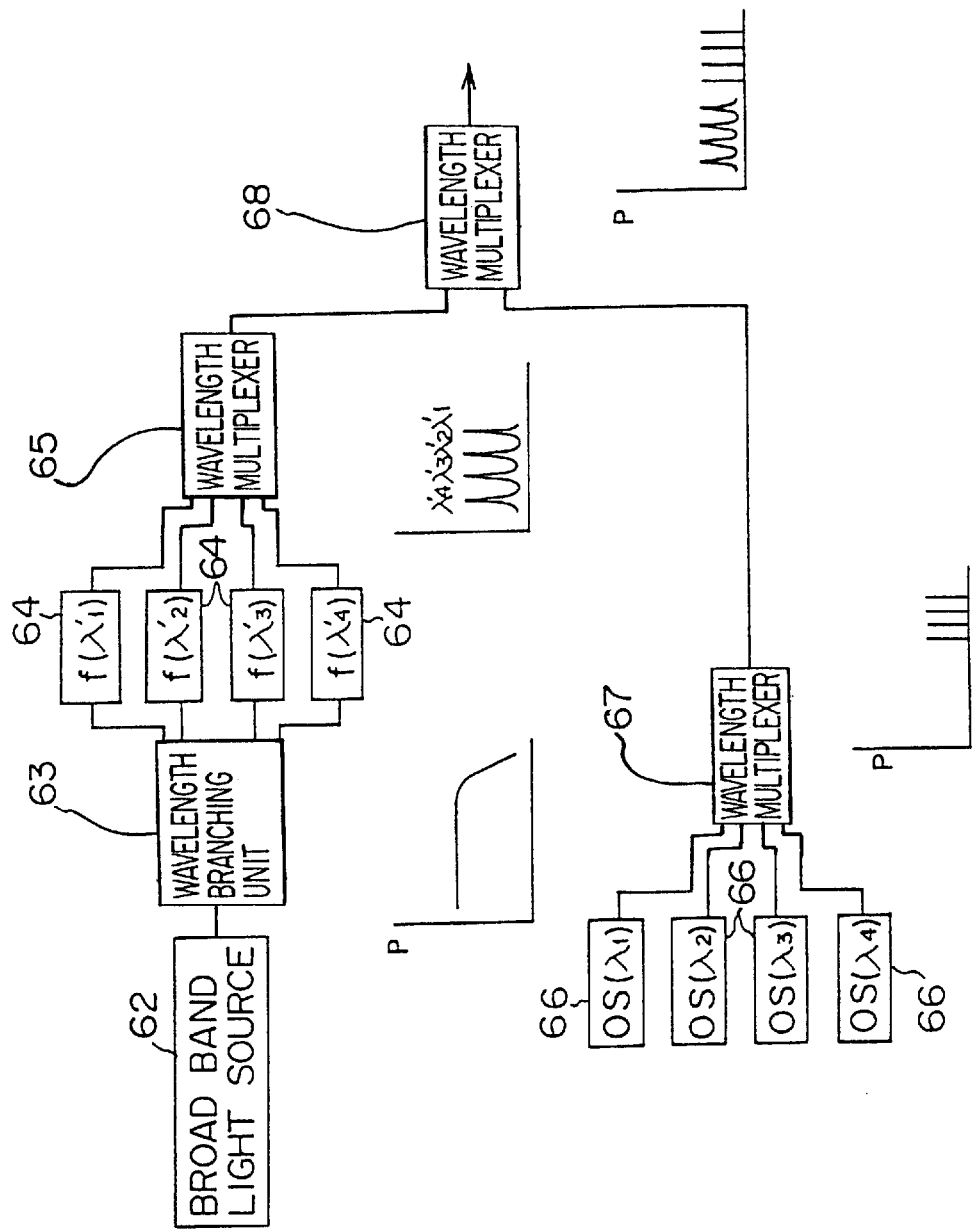
FIG. 16 shows an embodiment (No. 2) in which a compensation light is generated by passing a light from a broad-band light source through a narrow band filter.

FIGS. 15 and 16 show an embodiment in which a compensation light is generated by passing a light from a broad band light source through a narrow band filter.

FIG. 15 shows the state of the wavelength-multiplexed optical signal generated according to the present embodiment. According to the present embodiment, a compensation light is generated not by multiplexing a pump light with the portion indicated by the dotted lines in FIG. 15, but by passing a light output from a broad band light source through a narrow band filter. A light having a long wavelength (wavelengths λ1' through λ4') than the main signal having the wavelengths λ1 through λ4 is generated by passing a light from a broad band light source to a narrow band filter. However, the entire output power of an optical signal propagating in an optical fiber can be adjusted, for an output level predetermined when the system is designed, by adjusting the entire level of the optical signal having the wavelengths λ1' through λ4'. At this time, the compensation light can also be used in broadcast communications. That is, the compensation lights generated according to the present embodiment are obtained by only passing the lights from a broad band light source through a narrow band filter having respective passing bands. Therefore, the lights are not modulated or contain no information. The generated compensation light is modulated to transmit information. Since the compensation light for a corresponding wavelength is added/dropped, a compensation light is transmitted to each terminal station. Therefore, if information is transmitted through a compensation light, it can be transmitted to each terminal station and therefore can be used in broadcast communications.

FIG. 16 shows an example of the configuration of the transmission unit in a transmission station according to the present embodiment. With the configuration, a main signal and a compensation light are separately generated, and multiplexed later to generate an optical signal having the wavelength distribution or spectrum as shown in FIG. 15.

First, the output from a broad band light source 62 is input to a wavelength multiplexer 63. The wavelength distribution of the broad band light source 62 is shown below the broad band light source 62 in FIG. 16. The wavelength multiplexer 63 branches the output from the broad band light source 62 for the number of compensation lights to be generated (four in the case shown in FIGS. 15 and 16), and inputs the branched output to a narrow band filter 64 having each of the wavelengths λ1' through λ4' as a passing band. Lights output from the broad band light source 62 and passed through the narrow band filter 64 are output as a light (compensation light) having a narrow spectrum width around each wavelength as the center, and multiplexed by a wavelength multiplexer 65. When each compensation light is used in broadcast communications, a modulator is provided between the narrow band filter 64 and the wavelength multiplexer 65 to modulate a compensation light.

On the other hand, a main signal is output from an OS 66 having the wavelengths λ1 through 14 as an oscillation wavelength, and wavelength-multiplexed by a wavelength multiplexer 67. A light output from the OS 66 has already been modulated. Here, modulation of a light can be performed by directly changing an electric current provided for a light source such as a laser, etc., or a light output from a light source can be modulated by an external modulator into an optical signal.

Thus, the wavelength distribution of the generated main signal and compensation light is shown below the wavelength multiplexers 65 and 67 shown in FIG. 16. The main signal and the compensation light are multiplexed by a wavelength multiplexer 68, and transmitted to a transmission line. Thus, for example, in an optical wavelength-multiplexing system designed based on an eight-wave transmission, the features of the system can be compensated for using a compensation light even when only four waves are transmitted at the initialization of the system. Especially, according to the present invention, an OPC or a broad band light source replaces an OS for generating a compensation light. Therefore, an advantageous effect can be obtained both in cost and in size reduction.

In each of the above described embodiments, a pump light is deleted, stopped, or power-reduced down to a level at which nonlinear effect is not generated when the number of multiplexed wavelengths of a main signal is increased. When a compensation light is generated by passing a light from a broad band light source through a filter, the broad band light source is deleted, stopped, or limited in range or number of lights which pass through a filter. Thus, a stepwise system upgrade can be realized.

As described above, the initial cost of a wavelength-multiplexing system can be reduced without providing OSs for the number of compensation lights compared to the conventional technology. Furthermore, a more reliable and effective communications system can be provided by using a compensation light as a spare signal, an error detection signal, and in broadcast communications.

What is claimed is:

1. An optical communications terminal station for use in a wavelength-multiplexing optical transmission communications system, comprising:

an optical signal generation unit to generate and transmit at least one main signal containing information, such that when a plurality of main signals is generated and transmitted, the main signals have different wavelengths;

a light generation unit to generate a light having a power large enough to generate a nonlinear effect in an optical transmission line when fewer than a predetermined number of main signals is transmitted, and having a power small enough to avoid the nonlinear effect when the predetermined number of main signals is transmitted; and a coupler optically connected to the optical signal generation unit, the light generation unit and the optical transmission line, the coupler wavelength-multiplexing the at least one main signal with the light generated by the light generation unit to cause four-wave mixing in the optical transmission line when fewer than the predetermined number of main signals is transmitted.

2. The optical communications terminal station according to claim 1, wherein four-wave mixing in the optical transmission line produces a light that is received at a receiver; and said light produced by four-wave mixing and received by the receiver is used in detecting an error in said main signal.

3. The optical communications terminal station according to claim 1, wherein said light generated by said light generation unit is modulated to be used as an optical signal for use in broadcast communications.

4. The optical communications terminal station according to claim 1, wherein said light generated by said light generation unit is used as a power level adjustment light used when the main signal propagates in a transmission line.

5. A method of transmitting an optical signal for use in a wavelength multiplexing optical transmission communications system, comprising:

(a) generating and transmitting at least one main signal containing information, such that when a plurality of main signal is generated and transmitted, the main signals have different wavelengths;

(b) generating a light having a power large enough to generate a nonlinear effect in an optical transmission line when fewer than a predetermined number of main signals is transmitted, and having a power small enough to avoid the nonlinear effect when the predetermined number of main signals is transmitted;

(c) optically coupling the at least one main signal and the light generated in step (b); and (d) generating a light by four-wave mixing the main signal and the light generated in step (b) when less than the predetermined number of main signals is transmitted.

6. An optical communications device, comprising:

an optical signal generator to output less than or equal to a predetermined number of wavelength separated optical channels;

a light generator to output a compensating light having a power large enough to generate a nonlinear effect in an optical transmission line when fewer than the predetermined number of wavelength separated optical channels is output and having a power small enough to avoid the nonlinear effect when the predetermined number of wavelength separated optical channels is output; and a coupler to wavelength-multiplex the outputs of the optical signal generator and the light generator such that when the optical signal generator outputs less than the predetermined number of wavelength separated optical channels, four-wave mixing is caused in the optical transmission line.

7. An optical communications device according to claim 6, wherein four-wave mixing produces lights used in error detection.

8. A method of transmitting an optical signal for use in a wavelength multiplexing optical transmission communications system, comprising:

generating and transmitting at least one main signal containing information, such that when a plurality of main signal is generated and transmitted, the main signals have different wavelengths;

generating a supplemental light having a power large enough to generate a nonlinear effect in an optical transmission line when fewer than a predetermined number of main signals is transmitted, and having a power small enough to avoid the nonlinear effect when the predetermined number of main signals is transmitted;

optically coupling the at least one main signal and the supplemental light;

generating a light by four-wave mixing the main signal and the supplemental light when less than the predetermined number of main signals is transmitted; and reducing the power of the supplemental light when the predetermined number of main signals is transmitted.

9. A method according to claim 8, wherein the supplemental light is stopped when the predetermined number of main signals is transmitted.

* * * * *